Jan. 1, 1935.   W. H. PRATT   1,986,601
ELECTRICAL INSTRUMENT
Filed Dec. 7, 1931
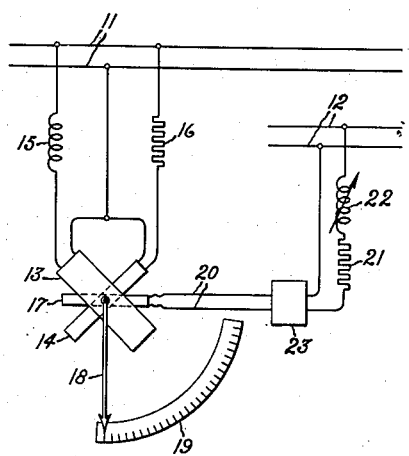
Inventor:
William H. Pratt,
by Charles V. Tullar
His Attorney.

Patented Jan. 1, 1935

1,986,601

UNITED STATES PATENT OFFICE 1,986,601

ELECTRICAL INSTRUMENT

William H. Pratt, Lynn, Mass., assignor to General Electric Company, a corporation of New York Application December 7, 1931, Serial No. 579,375

4 Claims. (Cl. 172—245)

My invention relates to electrical instruments and concerns particularly instruments for measuring the phase relationship between electrical quantities.

One of the principal objects of my invention is to provide devices responsive to the phase displacement between different sections of alternating-current electrical distribution or transmission systems. Another object is to provide a device capable of responding to phase differences between widely separated points in alternating-current systems.

In accordance with my invention I provide a member having a pair of crossed coils excited by one electrical circuit and with the currents therein differing in phase in order to produce a rotating field, and I provide a second member relatively rotatable with respect to the first excited by a second electrical circuit. The position assumed by the rotatable coil provides an indication of the phase relationship between the exciting circuits.

The features of my invention which I believe to be novel and patentable will be pointed out in the claims appended hereto. My invention itself, however, will be best understood by referring to the following description taken in connection with the accompanying drawing which represents schematically a pair of alternating-current circuits and, connected thereto, phase-measuring apparatus forming one embodiment of my invention.

Two alternating-current circuits are represented at 11 and 12. These are shown as single-phase circuits but it will be understood that my device is equally applicable to polyphase circuits. A member comprising the crossed coils 13 and 14 is excited by circuit 11. The coils are so arranged that the currents therein differ in phase and a rotating field is produced. Any suitable arrangement or connection for obtaining currents differing in phase may be employed. In connection with a single phase circuit as here shown phase difference may be obtained by using either inductive or condensive reactors, but I prefer to connect the coil 13 in series with an inductance 15 and coil 14 in series with a resistance 16. A coil 17 movable with respect to coils 13 and 14 is provided and has attached thereto a pointer 18 cooperating with scale 19. Coil 17 is excited from circuit 12 through a line 20 preferably containing a ballast resistance 21.

The reaction between the rotating field set up by the currents in coils 13 and 14 and the oscillating field set up by the current in coil 17 causes the movable coil 17 to take such a position that the field it sets up and the field set up by the stationary coils in the direction of the axis of the movable coil are a maximum at the same instant. Since the phase relationship between the two fields varies with variations in phase between sources 11 and 12, the angular position of the pointer 18 attached to coil 17 provides an indication of the phase relationship between circuits 11 and 12.

My device may be employed for measuring the phase displacement even when the circuits 11 and 12 or the points to which the instrument is connected are widely separated. If the line 20 is of great length I may provide reactance 22, which may be made variable in order substantially to tune the line to the frequency of the electrical circuits. This increases the sensitivity and assures phase coincidence between the current in coil 17 and the voltage of circuit 12. I may, if desired, also provide an amplifier 23 of any suitable type to increase the available torque and accuracy of the instrument.

In order to expand the most used portion of the scale of the instrument one of the crossed coils 13 and 14, preferably the coil 13 carrying the currents most widely displaced in phase from the exciting voltage if the phase displacements measured are usually small, is provided with a greater number of turns than the other coil 14. Coil 13 may, for example, have a number of turns which is of the order of five times the number used for coil 14. Although in order to obtain the greatest sensitivity I prefer to make the crossed coils 13 and 14 stationary and the coil 17 movable, it will be understood I am not limited to this precise arrangement. It will also be understood that in place of tuning the line 20 to the frequency of the electrical circuits, line 20 may be made highly inductive in which case the relative positions of the stationary and movable coils would be altered.

While I have described my invention as embodied in concrete form and as operating in a specific manner in accordance with the provisions of the Patent Statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States, is:

1. In combination with two alternating-current circuits of the same frequency, an instrument responsive to the phase relationship therebetween comprising a stationary coil connected to one of said circuits in series with resistance, a second stationary coil having an appreciably greater number of turns than the first, fixed at right angles thereto and connected to the same circuit in series with inductance, a coil rotatable with respect to said stationary coils and a pair of lines serving to connect said coil to a point of one of said circuits remote from said instrument and having connected therein resistance and sufficient inductance substantially to tune said line to the frequency of said alternating-current circuits.

2. In combination with two alternating-current circuits of the same frequency, an instrument responsive to the phase relationship therebetween, comprising a pair of relatively movable current conducting members each excited by one of said circuits, and a line substantially tuned to the frequency of said circuits serving to connect one of said members to a point of one of said circuits remote from said instrument, one of said members comprising a pair of angularly displaced coils arranged to have the currents therein differ in phase.

3. In combination with means supplying alternating current, an instrument energized by said means and responsive to the phase relationship between two alternating quantities one of which occurs at a point remote from said instrument comprising a movable coil carrying a current varying in phase with one of said quantities, cooperating therewith a stationary coil carrying a current varying in phase with the other of said quantities, a second stationary coil angularly displaced from the first, carrying a current differing in phase a substantially fixed amount from the current in the first stationary coil and a pair of lines including resistance and sufficient inductance substantially to tune said lines to the frequency of said alternating-current supply means and serving to conduct said current varying in phase with the alternating quantity at said remote point from said point to one of said coils, said stationary coils having an unequal number of turns in order to increase the sensitivity of the instrument in a given portion of its range.

4. In combination with means supplying alternating current, an instrument responsive to the phase relationship between two alternating quantities one of which occurs at a point remote from said instrument having a pair of relatively movable current conducting members excited by said current supply means, one of said members comprising a coil in which the current varies in phase with one of said alternating quantities and the other of said members comprising a pair of angularly displaced coils having an unequal number of turns in order to provide a greater sensitivity in a given portion of the instrument range and in which the currents differ in phase a fixed amount and vary in phase with the other of said alternating quantities and a pair of lines including resistance and sufficient inductance substantially to tune said lines to the frequency of said alternating-current supply means and serving to conduct said current varying in phase with the alternating quantity at said remote point from said point to one of said coils.

WILLIAM H. PRATT.